(12) United States Patent
Zabatani et al.

(10) Patent No.: US 10,735,713 B2
(45) Date of Patent: Aug. 4, 2020

(54) ONLINE COMPENSATION OF THERMAL DISTORTIONS IN A STEREO DEPTH CAMERA

(71) Applicant: Intel Corporation, Santa Clara, CA (US)

(72) Inventors: Aviad Zabatani, Even Yehuda (IL); Sagy Bareket, Haifa (IL); Ohad Menashe, Haifa (IL); Erez Sperling, D.N. Menashe (IL); Alex Bronstein, Haifa (IL); Michael Bronstein, Lugano (CH); Ron Kimmel, Haifa (IL); Vitaly Surazhsky, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/450,524

(22) Filed: Jun. 24, 2019

(65) Prior Publication Data

US 2019/0379879 A1   Dec. 12, 2019

Related U.S. Application Data

(63) Continuation of application No. 15/805,598, filed on Nov. 7, 2017, now Pat. No. 10,390,002, which is a
(Continued)

(51) Int. Cl.
*H04N 13/246* (2018.01)
*H04N 13/25* (2018.01)
*H04N 13/254* (2018.01)
*G06T 7/80* (2017.01)
*H04N 13/243* (2018.01)

*G06F 3/01* (2006.01)
*G06F 3/0488* (2013.01)
(Continued)

(52) U.S. Cl.
CPC ........... *H04N 13/246* (2018.05); *G06F 3/012* (2013.01); *G06F 3/017* (2013.01); *G06F 3/0488* (2013.01); *G06T 5/006* (2013.01); *G06T 7/85* (2017.01); *H04N 13/243* (2018.05); *H04N 13/25* (2018.05); *H04N 13/254* (2018.05); *H04N 2013/0081* (2013.01)

(58) Field of Classification Search
CPC ................................................. H04N 13/0246
See application file for complete search history.

(56) References Cited

U.S. PATENT DOCUMENTS 9,813,692 B2   11/2017   Zabatani et al.
10,390,002 B2   8/2019   Zabatani et al.
(Continued)

OTHER PUBLICATIONS

United States Patent and Trademark Office, "Notice of Allowance", issued in connection with U.S. Appl. No. 14/865,196, dated Jun. 30, 2017, 10 pages.
(Continued)

*Primary Examiner* — Nam D Pham
(74) *Attorney, Agent, or Firm* — Hanley, Flight & Zimmerman, LLC

(57) ABSTRACT

An example apparatus includes: a camera to record an image; memory to store instructions; and a processor in circuit with the memory, the processor to execute the instructions to: determine a depth based on: (a) the image and (b) a calibration parameter of the camera; and adjust the calibration parameter based on a temperature of the camera and the depth.

20 Claims, 7 Drawing Sheets

Related U.S. Application Data continuation of application No. 14/865,196, filed on Sep. 25, 2015, now Pat. No. 9,813,692.

(51) Int. Cl.
  *G06T 5/00* (2006.01)
  *H04N 13/00* (2018.01)

(56) References Cited

U.S. PATENT DOCUMENTS

| | | |
|---|---|---|
| 2015/0002628 A1 | 1/2015 | Reif |
| 2015/0363934 A1* | 12/2015 | Ko .................... G01C 21/3602 701/431 |
| 2017/0034502 A1 | 2/2017 | Aurongzeb et al. |
| 2017/0094255 A1 | 3/2017 | Zabatani et al. |
| 2018/0234673 A1 | 8/2018 | Zabatani et al. |

OTHER PUBLICATIONS

United States Patent and Trademark Office, "Notice of Allowance", issued in connection with U.S. Appl. No. 15/805,598, dated Jan. 24, 2019, 7 pages.

United States Patent and Trademark Office, "Notice of Allowance", issued in connection with U.S. Appl. No. 15/805,598, dated Jun. 19, 2019, 7 pages.

* cited by examiner

```
% Range
s1 = (2^PrecisionBits) / Rmax      % Range scaling
s2 = 2^CodeBits                     % Projector coordinate scale
alpha = 2/Width/Kc(1,1)             % Camera coordinates scaling
beta  = -(Kc(1,3)+1)/Kc(1,1)
gamma = 2/Height/Kc(2,2)
delta = -(Kc(2,3)+1)/Kc(2,2)

a = alpha/gamma
b = beta/gamma
c = delta/gamma d1 = distc(1)*gamma^2
d2 = distc(2)*gamma^4 p1 = Pp(2,4)*s1
p2 = -s1*s2*(Pp(1,4)+Pp(2,4))
p3 = -Pp(2,1)
p4 = -Pp(2,2)
p5 = -Pp(2,3)/gamma
p6 = s2*(Pp(1,1)+Pp(2,1))
p7 = s2*(Pp(1,2)+Pp(2,2))
p8 = s2*(Pp(1,3)+Pp(2,3))/gamma q = 1/gamma^2

% Texture
suv = 2^TexturePrecisionBits h0  = (Pt(1,2)+Pt(3,2)) / (Pt(1,1)+Pt(3,1))
h1  = (Pt(1,3)+Pt(3,3)) / (Pt(1,1)+Pt(3,1)) / gamma
h2  = (Pt(2,1)+Pt(3,1)) / (Pt(1,1)+Pt(3,1))
h3  = (Pt(2,2)+Pt(3,2)) / (Pt(1,1)+Pt(3,1))
h4  = (Pt(2,3)+Pt(3,3)) / (Pt(1,1)+Pt(3,1)) / gamma
h5  = 2*Pt(3,1) / (Pt(1,1)+Pt(3,1)) / suv
h6  = 2*Pt(3,2) / (Pt(1,1)+Pt(3,1)) / suv
h7  = 2*Pt(3,3) / (Pt(1,1)+Pt(3,1)) / suv / gamma
h8  = (Pt(1,4)+Pt(3,4)) / (Pt(1,1)+Pt(3,1)) * s1
h9  = (Pt(2,4)+Pt(3,4)) / (Pt(1,1)+Pt(3,1)) * s1
h10 = 2*Pt(3,4) / (Pt(1,1)+Pt(3,1)) * s1 / suv
```

FIG. 4

```
% Inverse camera model
x = a*xcam + b
y = ycam + c
r2 = x^2 + y^2
r2c = 1 + d1*r2 + d2*r2^2 + d5*r2^3
xc = x*r2c + 2*d3*x*y + d4*(r2 + 2*x^2)
yc = y*r2c + 2*d4*x*y + d3*(r2 + 2*y^2)
nrm = sqrt( xc^2 + yc^2 + q )

% R coefficients
TriangCoef1 = p1*nrm
TriangCoef2 = p2*nrm
TriangCoef3 = p3*xc + p4*yc + p5
TriangCoef4 = p6*xc + p7*yc + p8

% UV coefficients
TextureCoef1 = xc + h0*yc + h1
TextureCoef2 = h2*xc + h3*yc + h4
TextureCoef3 = h5*xc + h6*yc + h7
TextureCoef4 = h8*nrm
TextureCoef5 = h9*nrm
TextureCoef6 = h10*nrm % Range reconstruction
r = (TriangCoef1 * xp + TriangCoef2) /
    (TriangCoef3 * xp + TriangCoef4)

% Texture map reconstruction
den = TextureCoef3 * r + TextureCoef6
u   = (TextureCoef1 * r + TextureCoef4) / den
v   = (TextureCoef2 * r + TextureCoef5) / den
```

FIG. 5

ONLINE COMPENSATION OF THERMAL DISTORTIONS IN A STEREO DEPTH CAMERA

CROSS-REFERENCE TO RELATED APPLICATIONS

This patent arises from a continuation of U.S. patent application Ser. No. 15/805,598, filed Nov. 7, 2017, entitled "ONLINE COMPENSATION OF THERMAL DISTORTIONS IN A STEREO DEPTH CAMERA," which is a continuation of U.S. patent application Ser. No. 14/865,196, filed Sep. 25, 2015, entitled "ONLINE COMPENSATION OF THERMAL DISTORTIONS IN A STEREO DEPTH CAMERA," now U.S. Pat. No. 9,813,692. U.S. patent application Ser. No. 15/805,598 and U.S. patent application Ser. No. 14/865,196 are hereby incorporated herein by reference in their entireties.

FIELD OF THE INVENTION

Embodiments of the present invention relate to the field of camera systems that perform three-dimensional (3-D) measurements by use of active or passive triangulation capturing one or more images with or without the assistance of one or more patterns projected by a projector; more particularly, embodiments of the present invention relate to performing temperature compensation of such camera systems.

BACKGROUND OF THE INVENTION

Stereo depth cameras are well-known and are often used to measure a distance from an object. As part of the process, images of scenes are captured and measurements are taken to determine depth information. One method of determining the depth of objects in a scene from a captured image is made using triangulation.

In order to perform triangulation accurately, some calibration of the stereo depth camera is typically performed at assembly time. Calibration sets some intrinsic and extrinsic parameters of the stereo camera. Subsequent calibrations may be needed due to the system's deviation from initial calibration due to various external factors, such as temperature, humidity or barometric pressure changes, or displacement of sensing and/or projecting devices included in the system.

Stereo depth cameras are very sensitive to tiny changes in the optic elements intrinsic (e.g., Field of View or focal length) and extrinsic parameters. As a result of these changes, key depth image characteristics are biased such as absolute depth value, world coordinate y-axis yaw, scaling effects and more. Temperature variations may cause changes in the parameters, thereby causing errors in the determined depth generated by the triangulation process. Current solutions to these problems caused by temperature either ignore this source of distortion, or apply active thermal control to maintain the temperature at which the system was initially calibrated. The former approach is very weak for a real product since it implies a narrow working temperature range and the system being at the "working point" where the temperature is stable. The active thermal control allows correct operation in a wider range of temperatures, yet it consumes power, area and cost, which are all undesirable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 illustrates an example of coefficient precomputation parameters.

FIG. 5 illustrates an example of range and texture reconstruction and coefficient precomputation.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
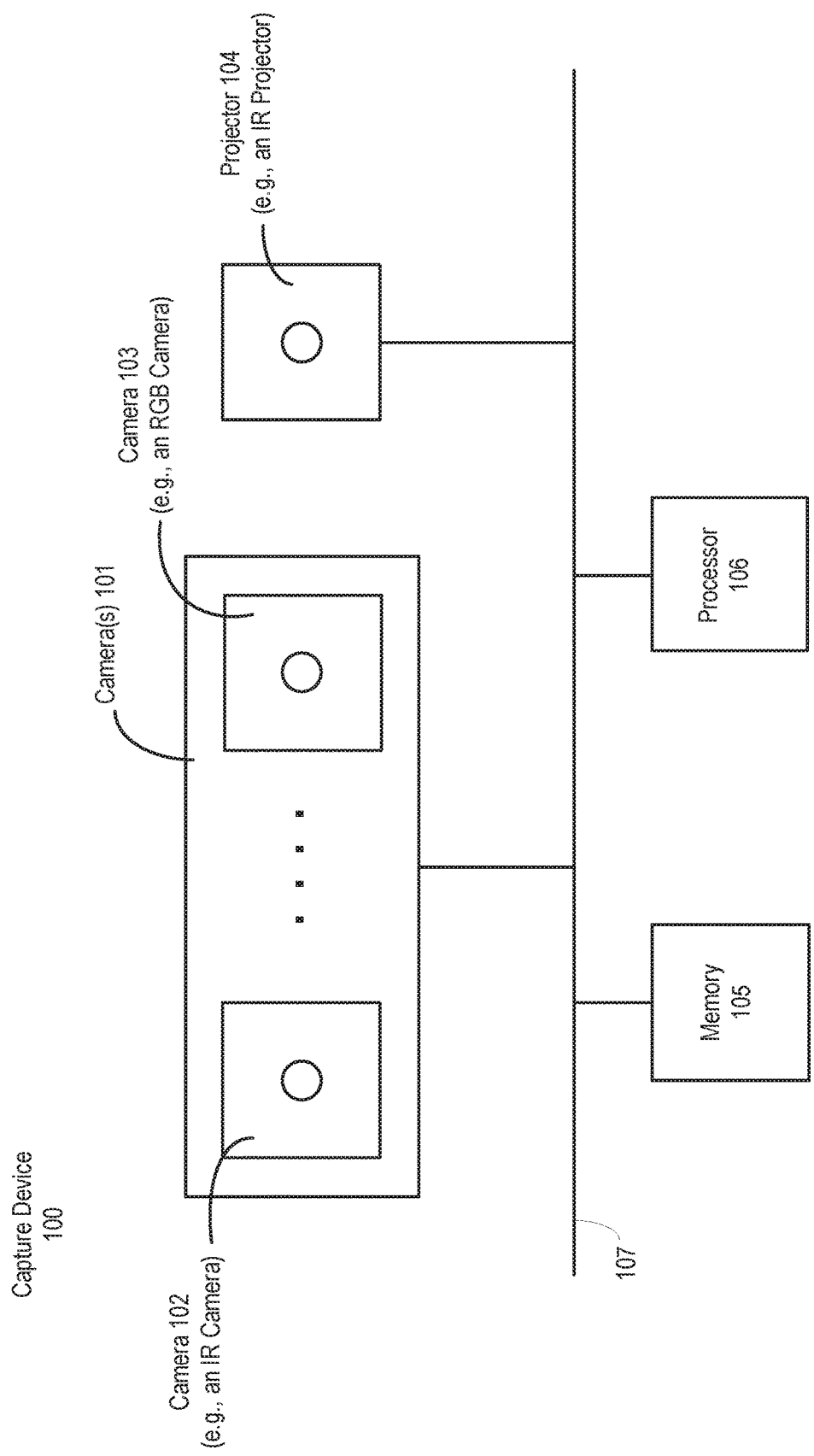
FIG. 1 illustrates one embodiment of an active coded light triangulation system.

FIG. 1 illustrates one embodiment of an active coded light triangulation system. The system includes coded light range cameras operating by projecting a sequence of one-dimensional binary ("black" and "white") patterns onto a scene, such that the produced binary code encodes the angle of the projection plane. Depth is then reconstructed by triangulating the intersection of a ray emanating from the camera with the plane emanating from the projector.

Referring to FIG. 1, capture device 100 may include a 3D scanner, a 3D camera or any other device configured for a 3D object acquisition. In some embodiments, as illustrated, capture device 100 includes an image capturing device 102 (e.g., a digital camera) and a projector unit 104, such as a laser projector or laser scanner, having a number of components. In some embodiments, digital camera 102 may comprise an infrared (IR) camera, and the projector unit 104 may comprise an IR projector.

Projector unit 104 is configured to project a light pattern as described above and may comprise a one-dimensional coded projector. In one embodiment, the light patterns comprise one-dimensional coded light patterns, e.g., the patterns that may be described by one-dimensional or linear codes. The light patterns formed by the laser planes on a surface of the object may be received by image capturing device 102 and sensed (e.g., read) by a sensor of image capturing device 102. Based on the readings of the multiple scans of the light patterns accumulated during a sensing cycle of the sensor, capture device 100 may be configured to reconstruct the shape of the object.

In some embodiments, capture device 100 may further include another image capturing device, such as digital camera 103. In some embodiments, digital camera 103 may have a resolution that is different than that of digital camera 103. For example, digital camera 102 may be a multi-chromatic camera, such as red, green, and blue (RGB) camera configured to capture texture images of an object.

Capture device 100 may further include a processor 106 that may be in operative communication with the image camera component 101 over a bus or interconnect 107. Processor 106 may include a standardized processor, a specialized processor, a microprocessor, or the like that may execute instructions that may include instructions for generating depth information, generating a depth image, determining whether a suitable target may be included in the depth image, or performing other operations described herein.

Processor 106 may be configured to reconstruct the object based on the images captured by digital camera 102, for example, using geometry techniques or other techniques used for 3D image reconstruction. Processor 106 may be further configured to dynamically calibrate capture device 100 to correct distortions in the reconstructed image of the object that may be caused, for example, by various external factors (e.g., temperature).

Capture device 100 may further include a memory 105 that may store the instructions that may be executed by processor 106, images or frames of images captured by the cameras, user profiles or any other suitable information, images, or the like. According to one example, memory 105 may include random access memory (RAM), read only memory (ROM), cache, Flash memory, a hard disk, or any other suitable storage component. As shown in FIG. 1, memory component 105 may be a separate component in communication with the cameras 101 and processor 106. Alternatively, memory 105 may be integrated into processor 106 and/or the image capture cameras 101. In one embodiment, some or all of the components 102-106 are located in a single housing.

Processor 105, memory 104, other components (not shown), image capturing device 102, and projector unit 104 may be coupled with one or more interfaces (not shown) configured to facilitate information exchange among the above-mentioned components. Communications interface(s) (not shown) may provide an interface for device 100 to communicate over one or more wired or wireless network(s) and/or with any other suitable device. In various embodiments, capture device 100 may be included to or associated with, but is not limited to, a server, a workstation, a desktop computing device, or a mobile computing device (e.g., a laptop computing device, a handheld computing device, a handset, a tablet, a smartphone, a netbook, ultrabook, etc.).

In one embodiment, capture device 100 is integrated into a computer system (e.g., laptop, personal computer (PC), etc.). However, capture device 100 can be alternatively configured as a standalone device that is couplable to such a computer system using conventional technologies including both wired and wireless connections.

In various embodiments, capture device 100 may have more or less components, and/or different architectures. For example, in some embodiments, capture device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, capture device 100 may have more or less components, and/or different architectures. In various embodiments, techniques and configurations described herein may be used in a variety of systems that benefit from the principles described herein.

Capture device 100 may be used for a variety of purposes, including, but not limited to, being part of a target recognition, analysis, and tracking system to recognize human and non-human targets in a capture area of the physical space without the use of special sensing devices attached to the subjects, uniquely identify them, and track them in three-dimensional space. Capture device 100 may be configured to capture video with depth information including a depth image that may include depth values via any suitable technique including, for example, triangulation, time-of-flight, structured light, stereo image, or the like.

Capture device 100 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, capture device 100 includes an IR light projector 404, an IR camera 102, and a visible light RGB camera 103 that are configured in an array.

Various techniques may be utilized to capture depth video frames. For example, capture device 100 may use structured light to capture depth information. In such an analysis, patterned light (i.e., light displayed as a known pattern such as a grid pattern or a stripe pattern) may be projected onto the capture area via, for example, IR light projector 104. Upon striking the surface of one or more targets or objects in the capture area, the pattern may become deformed in response. Such a deformation of the pattern may be captured by, for example, the IR camera 102 and/or the RGB camera 103 and may then be analyzed to determine a physical distance from capture device 100 to a particular location on the targets or objects.

Capture device 100 may utilize two or more physically separated cameras that may view a capture area from different angles, to obtain visual stereo data that may be resolved to generate depth information. Other types of depth image arrangements using single or multiple cameras can also be used to create a depth image.

Capture device 100 may provide the depth information and images captured by, for example, IR camera 102 and/or the RGB camera 103, including a skeletal model and/or facial tracking model that may be generated by capture device 100, where the skeletal and/or facial tracking models, depth information, and captured images are used to, for example, create a virtual screen, adapt the user interface, and control an application.

In summary, capture device 100 may comprise a projector unit 104, a digital camera (e.g., IR camera) 102, another digital camera (e.g., multi-chromatic camera) 103, and a processor (controller) configured to operate capture device 100 according to the embodiments described herein. However, the above assembly configuration is described for illustration purposes only, and is should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

Real-Time Thermal Distortion Compensation

Techniques described herein are directed to the problem of real-time correction of temperature-related drifts in the intrinsic and extrinsic geometric parameters of a stereo depth camera. In one embodiment, the technique includes a thermal process that includes measuring the current temperature of the capture device (e.g., capture device 100 of FIG. 1), or part thereof (e.g., IR camera, or near such a device), at one or several points, and applying a correction model on the fly to calibration parameters used in the process for generating depth or other values. In one embodiment, the process is the triangulation process. The result is a depth image with considerably diminished thermal distortions.

These techniques have a number of benefits such as passive sensing of the temperature and open loop fix on the result depth parameters. The techniques are both reasonably accurate and cost effective and can cope with a large range of ambient and self-heat temperatures.

More specifically, as discussed above, a coded light camera comprising an IR projector 104 projects one-dimensional code patterns onto the scene, and an IR camera 102 captures the patterns. Decoding of the captured patterns at every pixel location $x_c$ in the camera produces a code encoding the location $x_p$ of the projected plane. In triangulation, the plane is intersected with the ray emanating from the camera focal point through $x_c$, yielding the distance to the object $z(x_c)$. In one embodiment, triangulation relies on two types of parameters: the intrinsic parameters of camera 102 and the projector 104 characterizing their individual optical systems (such as focal distance, principal point of the projection, and a distortion model accounting for deviations from the perfect pin-hole model), and the extrinsic parameters specifying the relative location and orientation of projector 104 with respect to the camera (e.g., IR camera) 102.

For purposes herein, the intrinsic camera and projector parameters are collectively noted as $\theta_c$ and $\theta_p$, respectively, while the extrinsic parameters are denoted as $\theta_e$. These three sets of parameters are further collectively denoted as $\theta$. The triangulation process can be written symbolically as $$z=T(x_c,x_p;\theta):$$

The parameters $\theta=(\theta_c;\theta_p;\theta_e)$ are specific to a device and in one embodiment are determined by use of a calibration procedure, which is typically a part of the unit assembly process, or a global parametric model for the system.

However, during the operation of capture device 100, mechanical changes due to external or internal heating may change the parameters to a degree impacting adversely the quality of depth reconstruction. For example, uneven heating of the lens may cause its vertical shift impacting the focal length, or a rotation, impacting the principal point. Furthermore, the whole assembly may bend, impacting the convergence angle between the camera (e.g., camera 102) and the projector (e.g., projector 104).

Techniques described herein include a way to overcome this drawback of common designs by creating a parametric model that receives, as input(s), the reading of the unit temperature at one or more points in capture device 100, and produces as the output a correction of the unit intrinsic and extrinsic calibration parameters that are updated on the fly and used for triangulation. Denoting the temperature input as t, this can be written symbolically as:

$$\Delta\theta=C(t;a);$$

where a are the model parameters and $\Delta\theta$ is the correction.

Figure 2:
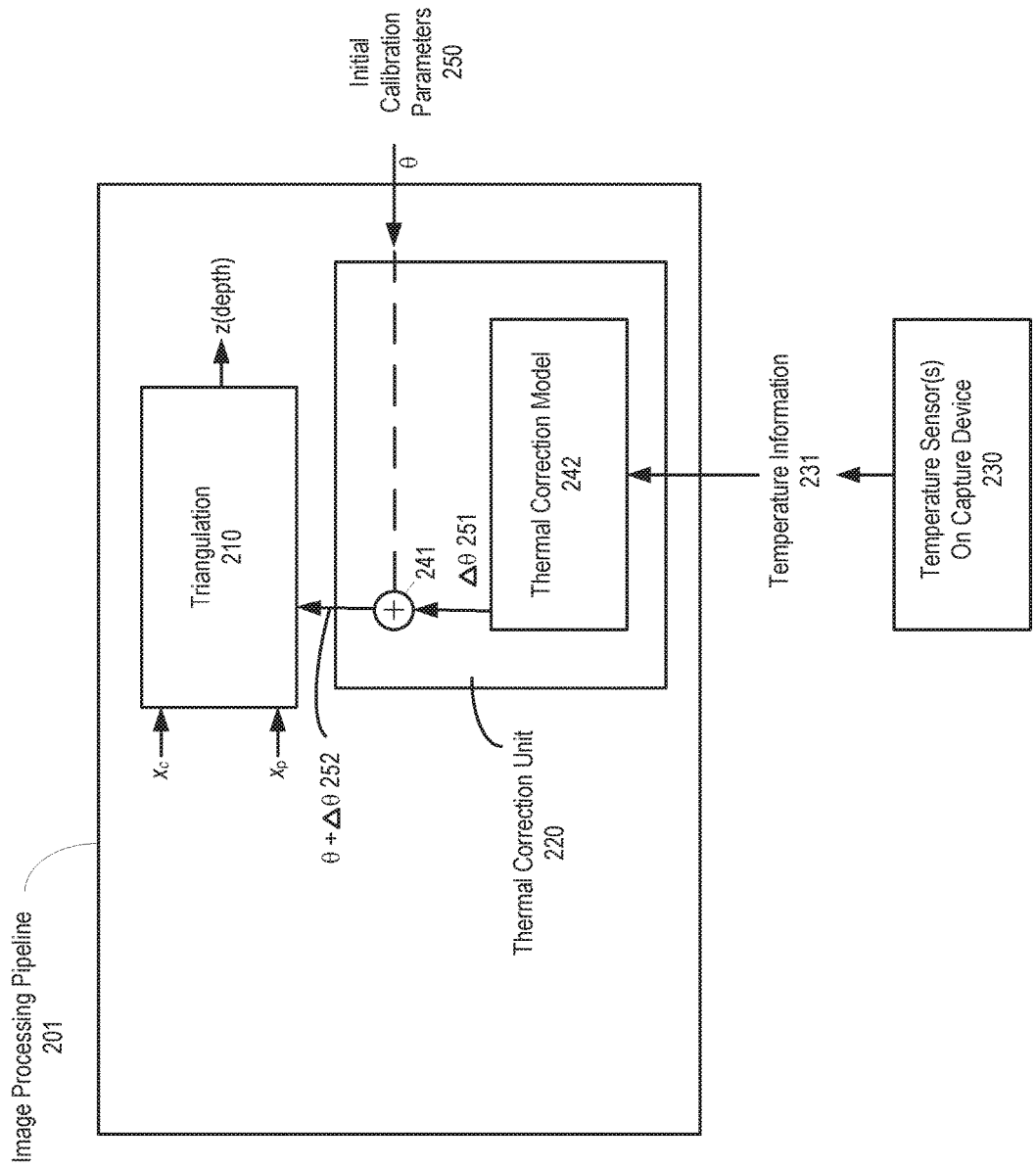
FIG. 2 is a block diagram depicting one embodiment of an online compensation scheme for a stereo depth camera.

FIG. 2 is a block diagram depicting one embodiment of an online compensation scheme for a stereo depth camera. The stereo depth camera comprise a projector configured to project a sequence of light patterns on an object, a first camera configured to capture a sequence of images of the object illuminated with the projected light patterns, and one or more temperature sensors to measure the temperature at one or more locations in the stereo camera. In one embodiment, a temperature sensor is attached to a printed circuit board (PCB) and located near the IR camera on the PCB to measure temperature at that location. In another embodiment, an additional temperature sensor is located on the PCB in the middle between the IR camera and the IR projector. In yet another embodiment, an additional temperature sensor is included near the IR projector on the PCB.

Referring to FIG. 2, an image processing pipeline 301 receives a sequence of images and determines depth information in response to parameters of the projector (e.g., projector 104) and camera (e.g., camera 102). Note that in one embodiment, image processing pipeline 201 of FIG. 2 is part of the capture device (e.g., the capture device of FIG. 1). In another embodiment, the image processing pipeline of FIG. 2 is not part of the capture device and performs triangulation in a separate device.

Image processing pipeline 201 includes a triangulation processing unit 210. Triangulation processing unit 210 receives $x_p$ and $x_c$, which are well-known in the triangulation process and calibration parameters and, in response thereto, generates depth values, z, by means of triangulation. The value of $x_p$, which corresponds to a pixel, is received as an input at the triangulation-based reconstruction module. This value includes a decoded value of a pixel location of the pixel on a projector plane, as determined from a binary code, which, in turn, is determined based on the image captured by the IR camera. The triangulation-based reconstruction process is configured to take into account the distortion due to temperature.

In one embodiment, triangulation processing unit 210 receives the calibration parameters from a thermal correction unit 220. In one embodiment, the calibration parameters characterize an optical system formed by the projector and the first camera and comprise intrinsic parameters of the first camera (e.g., IR camera) and the projector (e.g., IR projector) and extrinsic parameters of first camera (e.g., IR camera). In one embodiment, the intrinsic parameters comprise one or more of a focal distance of an IR camera, a principal point of projection of an IR projector, and a distortion model and wherein the extrinsic parameters comprise a relative location and orientation of the IR projector with respect to the IR camera.

Thermal correction unit 220 is responsive to temperature information 231 from the one or more temperature sensors 230 on the capture device (e.g., the capture device of FIG.

1). In response to the temperature information, thermal correction unit 220 adjusts one or more of the calibration parameters of the projector and the first camera that are provided to and used by triangulation processing unit 210 in generating the depth values.

In one embodiment, the calibration parameters are initialized by one or more calibration procedures and thermal correction unit 220 is operable to adjust one or more of these calibration parameters based on outputs from a thermal correction model 242 that is responsive to temperature information 231 from one or more temperature sensors 230.

In one embodiment, thermal correction unit 220 receives an initial set of calibration parameters θ (250) and temperature information 231 indicative of the temperature of at least a portion of the capture device (e.g., the temperature near the IR camera, the temperature at a location on the printed circuit board of the capture device between the IR camera and the IR projector, the temperature near the IR projector, etc.). In one embodiment, the initial set of calibration parameters θ (250) are those calibration parameters determined during assembly or manufacturing of the capture device (e.g., prior to deployment). This set of calibration parameters are set under specific temperature conditions that existed during the initial calibration process (i.e., the temperature at which the capture device is calibrated).

Thermal correction model 242 receives temperature information 231 and generates values (Δθ 251) for modifying calibration parameters in the initial set of calibration parameters θ 250. Computation unit 241 (e.g., adder) modifies the initial set of calibration parameters θ 250 based on the AO 251 output from thermal correction model 242 to produce a set of calibration parameters 252 that are input to triangulation unit 210.

In one embodiment, thermal correction model 242 is device-specific and can be generated by testing a device under different temperatures and recording changes for each individual calibration parameters (Δθ) for each specific change in temperature. For example, a capture device could be attached to a thermo-electric controller and be subjected to a variety of different temperatures to see their effect on the cameras and/or projectors in the device, with focus on the parameters that are based on the depth value generation process (e.g., triangulation). Once all the changes have been recorded, a function can be defined or identified that models the behavior of the device under those different temperature conditions. In one embodiment, graphs are generated that plot changes to each parameter versus the change in temperature (from the nominal temperature under which the capture device was originally calibrated). For each plot, a function that best represents the points in the plot is chosen. For example, in one embodiment, a linear model may represent the behavior of a particular parameter under different temperatures. In such a case, a coefficient α associated with generating a Δθ for that parameter may be set equal to the slope of the line representing the linear model. This may be shown with the following equation:

$$\Delta\theta_1(t) = a_1(t - t_0)$$

where $a_1$ is a coefficient representing the effect of temperature on the parameter $\theta_1$ (e.g., the slope of the linear function modeling the behavior of the parameter $\theta_1$ for various temperatures) from the difference in temperature between the current temperature t and temperature $t_0$, which is the nominal temperature under which the initial parameter $\theta_1$ use set and determined during initial calibration. While this example uses a linear model, the generation of Δθ values for compensation maybe based on non-linear models, at least in part because these values are device and implementation dependent.

Note the formula above only mentions one coefficient; however, in general, there will be a vector α containing a number of coefficients, one for each parameter that is to undergo compensation due to temperature.

In one embodiment, taking temperature measurements and the updating of Δθ values occurs every frame according to the frame rate. Thus, changes identified during one frame are used in processing the next fame.

Figure 3:
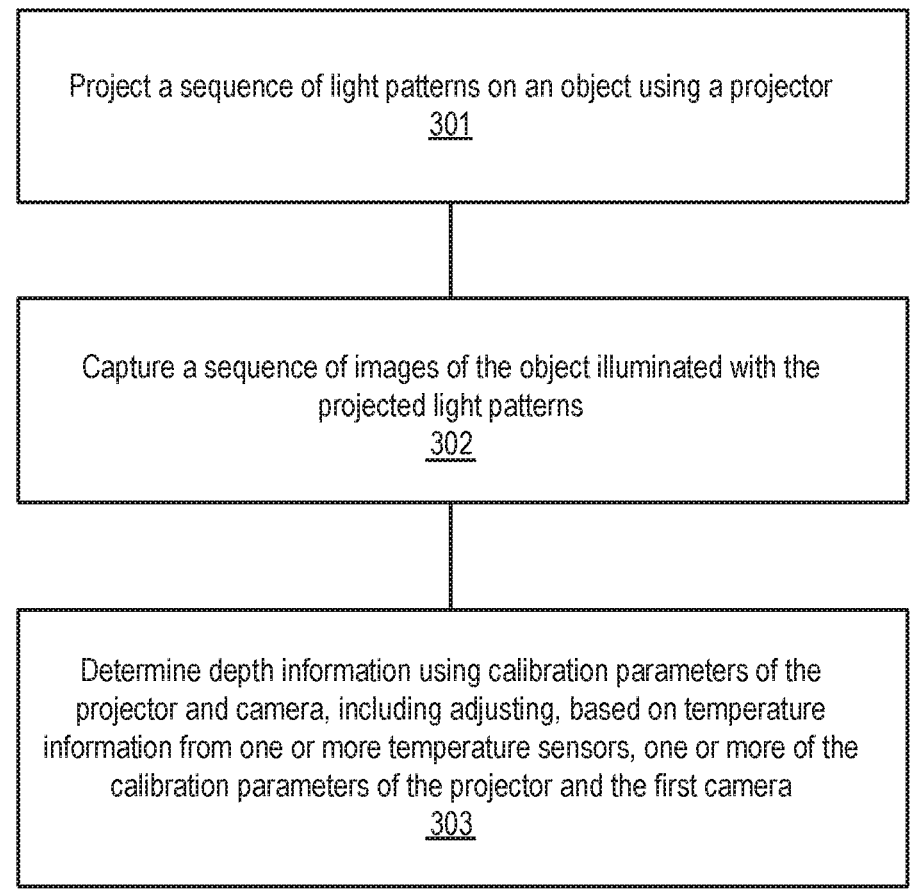
FIG. 3 is a flow diagram of one embodiment of a process for performing on-line temperature compensation for thermal distortions in a stereo depth camera.

FIG. 3 is a flow diagram of one embodiment of a process for performing on-line temperature compensation for thermal distortions in a stereo depth camera. The process is performed by processing logic that may comprise hardware (circuitry, dedicated logic, etc.), software (such as is run on a general purpose computer system or a dedicated machine), firmware, or a combination of these three.

Referring to FIG. 3, the process begins by projecting a sequence of light patterns on an object using a projector (processing block 301). In one embodiment, this is performed by projector 104 (e.g., an IR projector) of FIG. 1.

A camera captures a sequence of images of the object illuminated with the projected light patterns (processing block 302). In one embodiment, the camera is camera 102 (e.g., an IR camera) of FIG. 1.

From the captured sequence of images, processing logic determines depth information using calibration parameters of the projector and camera, including adjusting, based on temperature information from one or more temperature sensors, one or more of the calibration parameters of the projector and the first camera (processing block 303). In one embodiment, the calibration parameters characterize an optical system formed by the projector and the first camera and comprise intrinsic parameters of the first camera and the projector and extrinsic parameters of first camera. In one embodiment, the intrinsic parameters comprise one or more of a focal distance of the first camera, a principal point of projection of the projector, and a distortion model and wherein the extrinsic parameters comprise a relative location and orientation of the projector with respect to the first camera.

In on embodiment, determining depth information comprises performing a triangulation process using the calibration parameters. In one embodiment, the calibration parameters are initialized by one or more calibration procedures and adjusting calibration parameters of the projector and the camera is based on outputs from a thermal correction model that is responsive to the temperature information from the one or more temperature sensors.

FIG. 3 described above refers only to a time-multiplexed structural (coded) light system. The technologies described herein are applicable to other systems and ways of operation (e.g., passive stereo). For example, such systems may include passive stereo: 1) passive stereo systems comprising two (or more) calibrated cameras; 2) assisted stereo—as above plus an uncalibrated projector projecting some type of random noise onto the scene to improve correspondence computation between the cameras; and 3) coded light system comprising one (or more) calibrated camera and a calibrated projector projecting code. The latter code can be spatially multiplexed (single pattern), temporally multiplexed (multiple patterns), or both. The code can be one dimensional (encoding planes) or two-dimensional (encoding rays) or a combination of the two.

A Triangulation Process with an Exemplary Forward Model
Pattern Camera

Given a point x in world coordinates, it is projected onto the camera image plane by the following pin-hole model:

$$x'_c = K_c(I0)x \qquad (1)$$

where $x_c$ is a 4×1 vector representing the world point location in homogenous coordinates, $K_c$ is the 3×3 upper-triangular intrinsic camera matrix, $$K_c = \begin{pmatrix} f_x & & c_x \\ & f_y & c_y \\ & & 1 \end{pmatrix}, \qquad (2)$$

and $x_c$ is the 3×1 vector of uncorrected homogenous camera coordinates. The camera system of coordinates is assumed to coincide with the world coordinate system, therefore trivial rotation and translation (extrinsic) matrices are imposed.

Pattern Camera Lens Distortion

To account for the lens distortion, a parametric distortion model is applied. The corrected camera coordinates vector $x_c$ is related to its uncorrected counterpart $x'_c$ through the following inverse model given by $$x'_c = K_c D_\alpha(K_c^{-1} x_c) \qquad (3)$$

where D is a plane-to-plane map given by $$x' = (1 + \alpha_1 p^2 + \alpha_2 p^4 + \alpha_3 p^6)x + 2\alpha_4 ry + \alpha_5(p^2 + 2x^2)$$

$$y' = (1 + \alpha_1 p^2 + \alpha_2 p^4 + \alpha_3 p^6)y + 2\alpha_5 ry + \alpha_4(p^2 + 2y^2) \qquad (4)$$

with $p^2 = x'^2 + y'^2$. The parameters $\alpha_1$, $\alpha_2$, $\alpha_3$ govern the radial distortion component, while $\alpha_4$ and $\alpha_5$ account for the tangential one. The vector $\alpha = (\alpha_1, \ldots \alpha_5)^T$ is referred to herein as the camera inverse distortion parameters. Note that the difference between this inverse model versus the standard forward model used in other systems. The benefits of the teachings described herein will be evident when the reconstruction process is disclosed.

Projector

The projector is modeled as a one-dimensional pin-hole system $$x_p = K_p(R_p t_p)x = P_p x, \qquad (5)$$

where $x_p$ is the 2×1 vector of homogenous coordinate on the projector line, $K_p$ is the 2×3 intrinsic matrix, and $R_p$ and $t_p$ are the extrinsic rotation and translation transformation Parameters, respectively, relating between the camera and the projector coordinate systems. In one embodiment, the intrinsic and the extrinsic projector parameters are combined into a single 2×4 projection matrix $P_p$.

Texture Camera

The texture camera is modeled as a two-dimensional pin-hole system $$x'_t = K_t(R_t t_t)x = P_t x, \qquad (6)$$

where $x_t$ is the 3×1 uncorrected vector of homogenous coordinate on the camera plane, $K_t$ is the 3×3 intrinsic matrix, and $R_t$ and $t_t$ are the extrinsic rotation and translation transformation parameters, respectively, relating between the pattern and the texture cameras coordinate systems. In one embodiment, the intrinsic and the extrinsic texture camera parameters are combined into a single 3×4 projection matrix $P_t$.

Texture Camera Lens Distortion.

To account for the lens distortion, a forward parametric distortion model is applied:

$$x_t = K_t D_\beta(K_t^{-1} x'_t) \qquad (7)$$

where D is a plane-to-plane map given by $$x = (1 + \beta_1 p^2 + \beta_2 p^4 + \beta_3 p^6)x' + 2\beta_4 x'y' + \beta_5(p^2 + 2x^2)$$

$$y = (1 + \beta_1 p^2 + \beta_2 p^4 + \beta_3 p^6)y' + 2\beta_5 x'y' + \beta_4(p^2 + 2y^2) \qquad (8)$$

with $p^2 = x'^2 + y'^2$. The parameters $\beta_1$, $\beta_2$, $\beta_3$ govern the radial distortion component, while $\beta_4$ and $\beta_5$ account for the tangential one. The vector $\beta = (\beta_1, \ldots \beta_5)^T$ is referred to herein as the texture camera forward distortion parameters. The forward model is applied by transforming directly the texture image using $D_\beta$. In one embodiment, the process is performed on the host system due to the requirement of random access to the frame buffer.

Depth Reconstruction

The purpose of depth reconstruction is to establish for each pixel in the pattern camera image its distance from the camera center of coordinates. The term "depth" shall be understood as either the distance r or its projection z onto the optical axis of the pattern camera.

Given a pixel at position $x_c = (x_c, y_c, 1)^T$ in the camera image plane and the corresponding code value $x_p = (x_p, 1)^T$ of the projector, by applying the inverse distortion model (7), a corrected pixel location $x'_c = (x'_c, y'_c, 1)^T$ is obtained. The pinhone camera projection (1) introduces ambiguity by projecting all points along the ray $x = rd$, $r > 0$, to $x'_c$.

In order to characterize the ray $d = (d_x, d_y, d_z)^T$, the following is written $$\beta x'_c = K_c d, \qquad (9)$$

where $\beta \neq 0$ is an arbitrary scaling factor. This yields $$d_z x'_c = (K_c)_1^T d = f_x d_x + c_x d_z$$

$$d_z y'_c = (K_c)_2^T d = f_y d_y + c_y d_z \qquad (10)$$

where $(K_c)_i^T$ denotes the i-th row vector of $K_c$. Solving for $d_x$, $d_y$ and $d_z$ gives $$d = \begin{pmatrix} f_x^{-1}(x'_c - c_x) \\ f_y^{-1}(y'_c - c_y) \\ 1 \end{pmatrix} \qquad (11)$$

Since the pixel grid is fixed at reconstruction, the described process is precomputed for every pixel in the image.

The projector forward model (6) introduces ambiguity by projecting an entire plane onto $x_p$; however, the intersection of the latter plane with the ray $x = rd$ yields a unique point in space. Substituting the unit direction $d = d/\|d\|$ into the projector model gives $$\beta x_p = P_p(_1^{rd}), \qquad (12)$$

which can be rewritten as $$\beta x_p = \frac{rp_1^T d + 1q_1}{rp_2^T d + 1q_2} = \frac{rp_1^T d + 1q_1\|d\|}{rp_2^T d + 1q_2\|d\|} \qquad (13)$$

where the projector matrix is decomposed into $$P_p = \begin{pmatrix} p_1^T q_1 \\ p_2^T q_2 \end{pmatrix} \qquad (14)$$

Solving for r, one has the depth $$r = \frac{T_1 x_p + T_2}{T_3 x_p + T_4} \quad (15)$$

where $T_1 = q_2\|d\|$ $T_2 = -q_1\|d\|$ $T_3 = p_2^T d$ $T_4 = -p_1^T d \quad (16)$ are scalar coefficients depending only on the pixel location $x_c$ (and therefore can be precomputed). For purposes herein $T_1, \ldots T_4$ are referred to as to range triangulation coefficients. Note that using the unnormalized ray saves one division operation.

The depth r can be further projected onto $d_z$ yielding $$z = \frac{T_1 x_p + T_2 d_z}{T_3 x_p + T_4 \|d\|} \quad (17)$$

$$= \frac{T'_1 x_p + T'_2}{T_3 x_p + T_4}$$

where $T'_1 = q_2 d_z$ $T'_2 = -q_1 d_z \quad (18)$ are the modified coefficients.

Texture Map Reconstruction

Once the range has been established, the texture map coordinates are reconstructed using the forward model $x_t = P_t(1^{rd}) = P_t(\|d\|^{rd}) \quad (19)$ from where $$x_t = \frac{r p_1^T d + q_1 \|d\|}{r p_3^T d + q_3 \|d\|} \quad (20)$$

$$y_t = \frac{r p_2^T d + q_2 \|d\|}{r p_3^T d + q_3 \|d\|}$$

where $(p_i^T q_i)$ is the i-th row of $\beta_t$. This can be rewritten as $$x_t = \frac{\sigma_1 r + \sigma_4}{\sigma_3 r + \sigma_6} \quad (21)$$

$$y_t = \frac{\sigma_2 r + \sigma_5}{\sigma_3 r + \sigma_6},$$

where $\sigma_1 = p_1^T d$ $\sigma_2 = p_2^T d$ $\sigma_3 = p_3^T d$ $\sigma_4 = q_1 \|d\|$ $\sigma_5 = q_2 \|d\|$ $\sigma_6 = q_3 \|d\|. \quad (22)$ In case the output depth is projected onto the camera optical axis, texture coordinates are obtained from $r = z\|d\|/d_z$, $$x_t = \frac{z p_1^T d \|d\| + q_1 \|d\| d_z}{r p_3^T d + q_3 \|d\|} \frac{z p_1^T d + q_1 d_z}{z p_3^T d + q_3 d_z} \quad (23)$$

and, similarly, $$y_t = \frac{z p_2^T d + q_2 d_z}{z p_3^T d + q_3 d_z} \quad (24)$$

This can be expressed as (21) with $\sigma_4$, $\sigma_5$ replaced by $\sigma_6$ replaced by $\sigma'_4 = q_1 d_z$ $\sigma'_5 = q_2 d_z$ $\sigma'_6 = q_3 d_z. \quad (25)$ Coefficient Scaling and Precomputation In the following, a compact and efficient way to compute the coefficients $T_i$ and $\sigma_i$ is disclosed. It assumes the pattern camera coordinates to be unnormalized and translated from $[-1, 1]^2$ to $[0, W-1] \times [0, H-1]$; the projector coordinate is assumed to be translated from $[-1, 1]$ to $[0; s_2-1]$ ($s_2 = 2^{15} - 1$ in one embodiment); the output range or depth is mapped from the interval $[0; r_{max}]$ to $[0, 2^{16} - 1]$ by the scaling factor $s_1$; and the texture map coordinates are computed translated from $[-1, 1]$ to $[0, s_{uv}]$ with $s_{uv} = 2^{12} - 1$ in one embodiment.

Inverse Camera Distortion Model.

Substituting the scales into the camera distortion model, the following is obtained with appropriate scaling $$x = \frac{2}{W f_x} x_c - \frac{H}{2} \frac{f_y}{f_x} (c_x + 1) \quad (26)$$

$$y = y_c - \frac{H}{2}(c_y + 1).$$

The distortion model becomes $x' = (1 + d_1 p^2 + d_2 p^4 + d_3 p^6) x + 2 d_4 xy + d_5 (p^2 + 2x^2)$ $y' = (1 + d_1 p^2 + d_2 p^4 + d_3 p^6) y + 2 d_5 xy + d_4 (p^2 + 2y^2) \quad (27)$ $p^2 = +y^2$ and $d_i$ are the distortion parameters scaled according to $$d_1 = \left(\frac{2}{H f_y}\right)^2 \alpha_1 \quad (28)$$

$$d_2 = \left(\frac{2}{H f_y}\right)^4 \alpha_2$$

$$d_3 = \alpha_3$$

$$d_4 = \left(\frac{2}{H f_y}\right)^2 \alpha_4$$

$$d_5 = \left(\frac{2}{H f_y}\right)^2 \alpha_5.$$

Ray Direction

With the selected scaling, the unnormalized ray d passing through the pixel becomes $$d = \left(x', y', \frac{Hf_y}{2}\right), \quad (29)$$

and its norm $$\|d\| = \sqrt{x'^2 + y'^2 + q}, \quad (30)$$

where $$q = \left(\frac{Hf_y}{2}\right)^2 \quad (31)$$

Range Coefficients

In one embodiment, range coefficients assume the form $$T_1 = p_1 \|d\|$$

$$T_2 = p_2 \|d\|$$

$$T_3 = p_3 x' + p_4 y' + p_5$$

$$T_4 = p_6 x' + p_7 y' + p_8 \quad (32)$$

where $$p_1 = (P_p)_{24} s_1 \quad (33)$$

$$p_2 = -s_1 s_2 ((P_p)_{14} + (P_p)_{24})$$

$$p_3 = -(P_p)_{21}$$

$$p_4 = -(P_p)_{22}$$

$$p_5 = -(P_p)_{23} \frac{H}{2} f_y$$

$$p_6 = s_2 ((P_p)_{11} + (P_p)_{21})$$

$$p_7 = s_2 ((P_p)_{12} + (P_p)_{22})$$

$$p_8 = s_2 ((P_p)_{13} + (P_p)_{23}) \frac{H}{2} f_y$$

are precomputed from the system parameters. Depth reconstruction is obtained with $$T'_1 = p'_1$$

$$T'_2 = p'_2 \quad (34)$$

where $$p'_1 = p'_1 \sqrt{q}$$

$$p'_2 = p'_2 \sqrt{q}. \quad (35)$$

Texture Map Coefficients

Texture map coefficients are precomputed as $$\sigma_1 = x' + h_0 y' + h_i$$

$$\sigma_2 = h_2 x' + h_3 y' + h_4$$

$$\sigma_3 = h_5 x' + h_6 y' + h_7$$

$$\sigma_4 = h_8 \|d\|$$

$$\sigma_5 = h_9 \|d\|$$

$$\sigma_6 = h_{10} \|d\|, \quad (36)$$

where $$h_0 = \frac{(P_t)_{12} + (P_t)_{32}}{(P_t)_{11} + (P_t)_{31}} \quad (37)$$

-continued $$h_1 = \frac{(P_t)_{13} + (P_t)_{33}}{(P_t)_{11} + (P_t)_{31}} \frac{H}{2} f_y$$

$$h_2 = \frac{(P_t)_{21} + (P_t)_{31}}{(P_t)_{11} + (P_t)_{31}}$$

$$h_3 = \frac{(P_t)_{22} + (P_t)_{32}}{(P_t)_{11} + (P_t)_{31}}$$

$$h_4 = \frac{(P_t)_{23} + (P_t)_{33}}{(P_t)_{11} + (P_t)_{31}} \frac{H}{2} f_y$$

$$h_5 = \frac{(P_t)_{31}}{(P_t)_{11} + (P_t)_{31}} \frac{2}{s_{uv}}$$

$$h_6 = \frac{(P_t)_{32}}{(P_t)_{11} + (P_t)_{31}} \frac{2}{s_{uv}}$$

$$h_7 = \frac{(P_t)_{33}}{(P_t)_{11} + (P_t)_{31}} \frac{2}{s_{uv}} f_y$$

$$h_8 = \frac{(P_t)_{14} + (P_t)_{34}}{(P_t)_{11} + (P_t)_{31}} \frac{H}{2} s_1$$

$$h_9 = \frac{(P_t)_{24} + (P_t)_{34}}{(P_t)_{11} + (P_t)_{31}} s_1$$

$$h_{10} = 2 \frac{(P_t)_{34}}{(P_t)_{11} + (P_t)_{31}} \frac{s_1}{s_{uv}}.$$

When texture map is reconstructed from z rather than from r, $$\sigma'_4 = h'_8$$

$$\sigma'_5 = h'_9$$

$$\sigma'_6 = h'_{10} \quad (38)$$

are used with $$h'_8 = h_8 \sqrt{q}$$

$$h'_9 = h_9 \sqrt{q}$$

$$h'_{10} = h_{10} \sqrt{q} \quad (39)$$

FIG. 4 illustrates an example of coefficient precomputation. FIG. 5 illustrates an example of range and texture reconstruction and coefficient precomputation.

Figure 6:
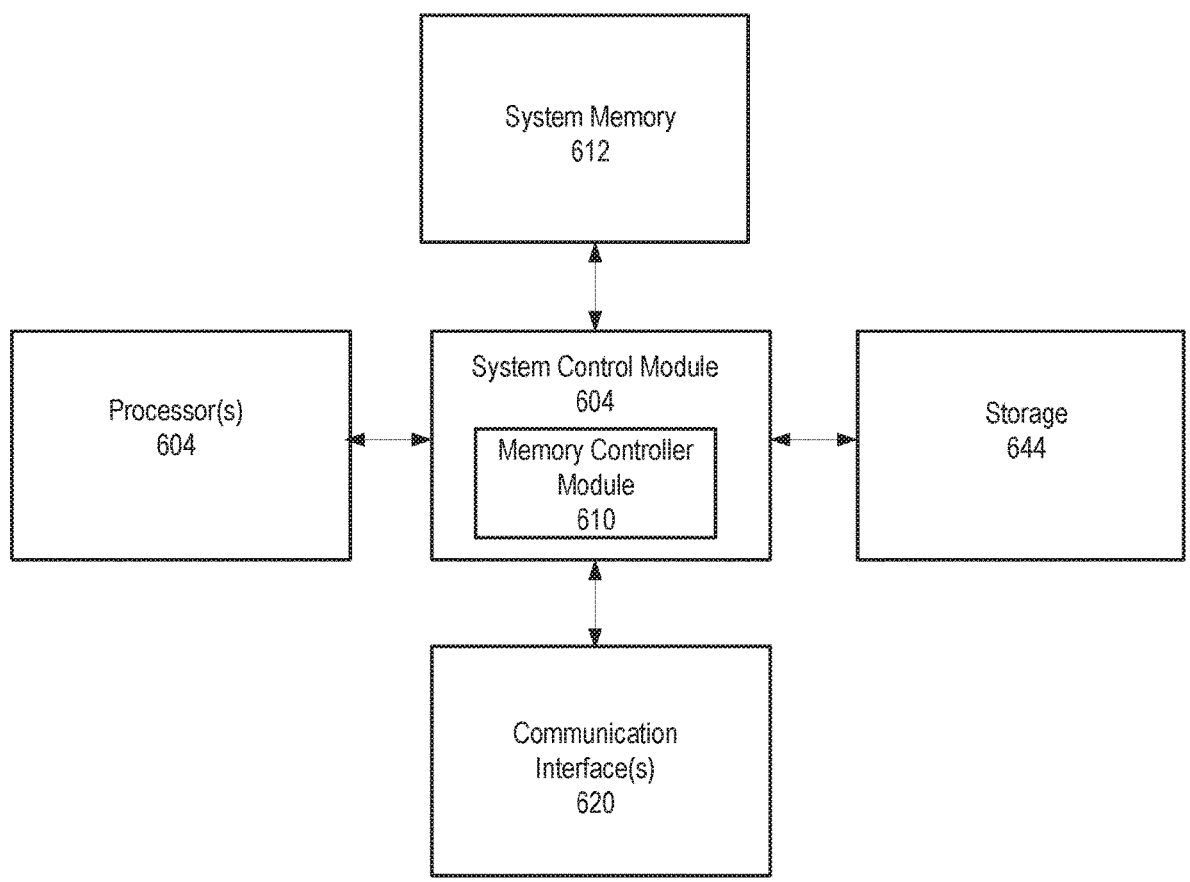
FIG. 6 is a block diagram of one embodiment of a system.

FIG. 6 illustrates, for one embodiment, an example system 600 having one or more processor(s) 604, system control module 608 coupled to at least one of the processor(s) 604, system memory 612 coupled to system control module 608, non-volatile memory (NVM)/storage 614 coupled to system control module 608, and one or more communications interface(s) 620 coupled to system control module 608. In some embodiments, the system 600 may include capture device 100 and provide logic/module that performs functions aimed at compensating for temperature in the depth determination and correcting distortions in a reconstructed object image described herein.

In some embodiments, the system 600 may include one or more computer-readable media (e.g., system memory or NVM/storage 614) having instructions and one or more processors (e.g., processor(s) 604) coupled with the one or more computer-readable media and configured to execute the instructions to implement a module to perform image distortion correction calculation actions described herein.

System control module 608 for one embodiment may include any suitable interface controllers to provide for any suitable interface to at least one of the processor(s) 604 and/or to any suitable device or component in communication with system control module 608.

System control module 608 may include memory controller module 610 to provide an interface to system memory 612. The memory controller module 610 may be a hardware module, a software module, and/or a firmware module. System memory 612 may be used to load and store data and/or instructions, for example, for system 600. System memory 612 for one embodiment may include any suitable volatile memory, such as suitable DRAM, for example. System control module 608 for one embodiment may include one or more input/output (I/O) controller(s) to provide an interface to NVM/storage 614 and communications interface(s) 620.

The NVM/storage 614 may be used to store data and/or instructions, for example. NVM/storage 614 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 614 may include a storage resource physically part of a device on which the system 600 is installed or it may be accessible by, but not necessarily a part of, the device. For example, the NVM/storage 614 may be accessed over a network via the communications interface(s) 620.

Communications interface(s) 620 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 604 may be packaged together with logic for one or more controller(s) of system control module 608, e.g., memory controller module 610. For one embodiment, at least one of the processor(s) 604 may be packaged together with logic for one or more controllers of system control module 608 to form a System in Package (SiP). For one embodiment, at least one of the processor(s) 604 may be integrated on the same die with logic for one or more controller(s) of system control module 608. For one embodiment, at least one of the processor(s) 604 may be integrated on the same die with logic for one or more controller(s) of system control module 608 to form a System on Chip (SoC).

In various embodiments, the system 600 may have more or less components, and/or different architectures. For example, in some embodiments, the system 600 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 600 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 600 may be any other electronic device.

Figure 7:
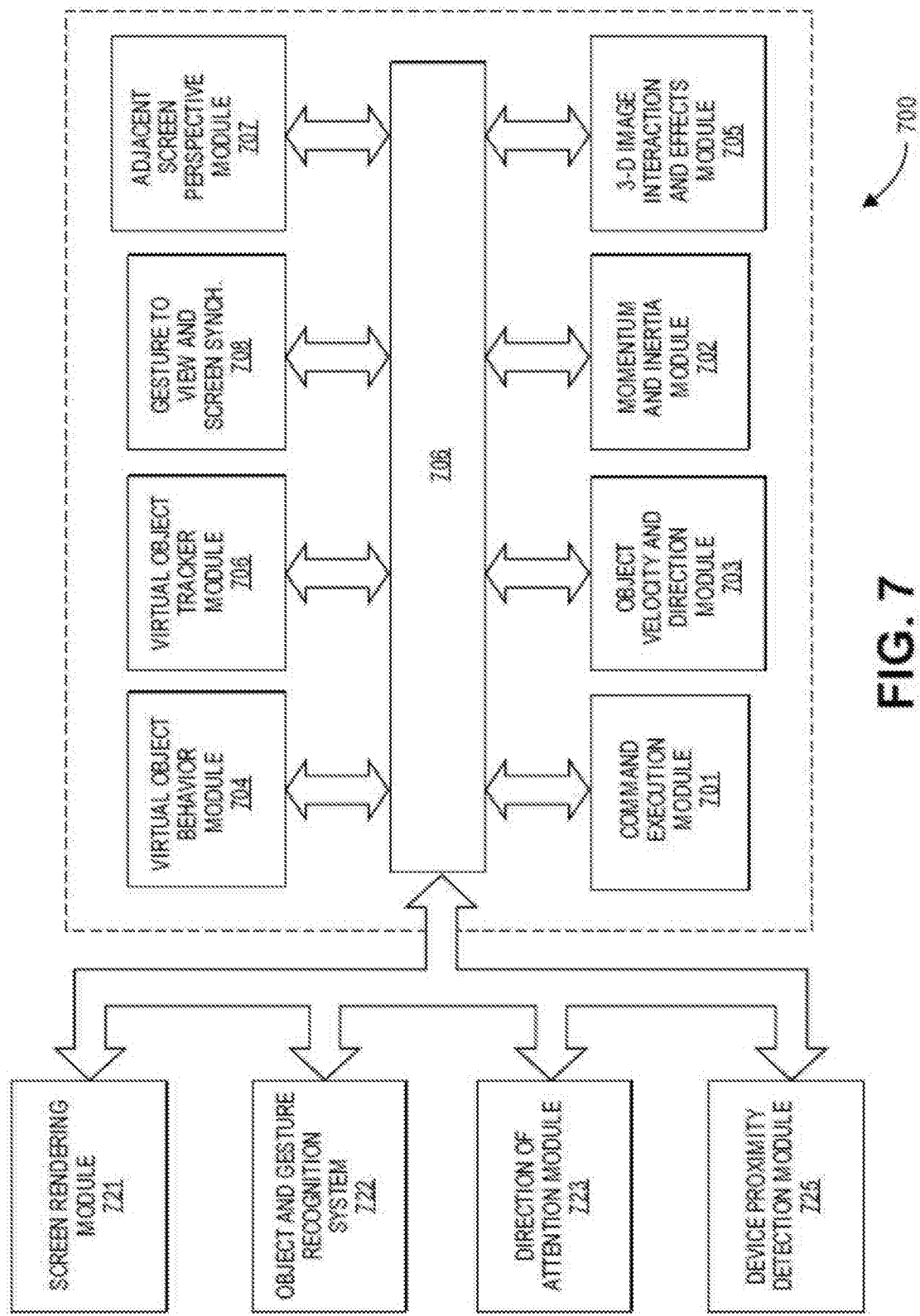
FIG. 7 illustrates an embodiment of a computing environment 700 capable of supporting the operations.

FIG. 7 illustrates an embodiment of a computing environment 700 capable of supporting the operations discussed above. The modules described before can use the depth information (e.g., values) and other data described above to perform these functions. The modules and systems can be implemented in a variety of different hardware architectures and form factors.

Command Execution Module 701 includes a central processing unit to cache and execute commands and to distribute tasks among the other modules and systems shown. It may include an instruction stack, a cache memory to store intermediate and final results, and mass memory to store applications and operating systems. Command Execution Module 701 may also serve as a central coordination and task allocation unit for the system.

Screen Rendering Module 721 draws objects on the one or more multiple screens for the user to see. It can be adapted to receive the data from Virtual Object Behavior Module 704, described below, and to render the virtual object and any other objects and forces on the appropriate screen or screens. Thus, the data from Virtual Object Behavior Module 704 would determine the position and dynamics of the virtual object and associated gestures, forces and objects, for example, and Screen Rendering Module 721 would depict the virtual object and associated objects and environment on a screen, accordingly. Screen Rendering Module 721 could further be adapted to receive data from Adjacent Screen Perspective Module 707, described below, to either depict a target landing area for the virtual object if the virtual object could be moved to the display of the device with which Adjacent Screen Perspective Module 707 is associated. Thus, for example, if the virtual object is being moved from a main screen to an auxiliary screen, Adjacent Screen Perspective Module 707 could send data to the Screen Rendering Module 721 to suggest, for example in shadow form, one or more target landing areas for the virtual object on that track to a user's hand movements or eye movements.

Object and Gesture Recognition System 722 may be adapted to recognize and track hand and harm gestures of a user. Such a module may be used to recognize hands, fingers, finger gestures, hand movements and a location of hands relative to displays. For example, Object and Gesture Recognition System 722 could for example determine that a user made a body part gesture to drop or throw a virtual object onto one or the other of the multiple screens, or that the user made a body part gesture to move the virtual object to a bezel of one or the other of the multiple screens. Object and Gesture Recognition System 722 may be coupled to a camera or camera array, a microphone or microphone array, a touch screen or touch surface, or a pointing device, or some combination of these items, to detect gestures and commands from the user.

The touch screen or touch surface of Object and Gesture Recognition System 722 may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by Object and Gesture Recognition System 722, using one or more cameras, without the benefit of a touch surface.

Direction of Attention Module 723 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to Object and Gesture Recognition Module 722 to ensure that the gestures or commands are associated with the appropriate library for the active display. Similarly, if the user is looking away from all of the screens, then commands can be ignored.

Device Proximity Detection Module 725 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to Object Gesture and Recognition System 722. For a display device, it may be considered by Adjacent Screen Perspective Module 707.

Virtual Object Behavior Module 704 is adapted to receive input from Object Velocity and Direction Module 703, and to apply such input to a virtual object being shown in the display. Thus, for example, Object and Gesture Recognition System 722 would interpret a user gesture and by mapping the captured movements of a user's hand to recognized movements, Virtual Object Tracker Module 706 would associate the virtual object's position and movements to the movements as recognized by Object and Gesture Recognition System 722, Object and Velocity and Direction Module 703 would capture the dynamics of the virtual object's movements, and Virtual Object Behavior Module 704 would receive the input from Object and Velocity and Direction Module 703 to generate data that would direct the movements of the virtual object to correspond to the input from Object and Velocity and Direction Module 703.

Virtual Object Tracker Module 706 on the other hand may be adapted to track where a virtual object should be located in three-dimensional space in a vicinity of a display, and which body part of the user is holding the virtual object, based on input from Object Gesture and Recognition System 722. Virtual Object Tracker Module 706 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

Gesture to View and Screen Synchronization Module 708, receives the selection of the view and screen or both from Direction of Attention Module 723 and, in some cases, voice commands to determine which view is the active view and which screen is the active screen. It then causes the relevant gesture library to be loaded for Object and Gesture Recognition System 722. Various views of an application on one or more screens can be associated with alternative gesture libraries or a set of gesture templates for a given view.

Adjacent Screen Perspective Module 707, which may include or be coupled to Device Proximity Detection Module 725, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. Adjacent Screen Perspective Module 707 may, in this way, determine coordinates of an adjacent screen relative to its own screen coordinates. Thus, the Adjacent Screen Perspective Module may determine which devices are in proximity to each other, and further potential targets for moving one or more virtual object's across screens. Adjacent Screen Perspective Module 707 may further allow the position of the screens to be correlated to a model of three-dimensional space representing all of the existing objects and virtual objects.

Object and Velocity and Direction Module 703 may be adapted to estimate the dynamics of a virtual object being moved, such as its trajectory, velocity (whether linear or angular), momentum (whether linear or angular), etc. by receiving input from Virtual Object Tracker Module 706. The Object and Velocity and Direction Module 703 may further be adapted to estimate dynamics of any physics forces, by for example estimating the acceleration, deflection, degree of stretching of a virtual binding, etc. and the dynamic behavior of a virtual object once released by a user's body part. Object and Velocity and Direction Module 703 may also use image motion, size and angle changes to estimate the velocity of objects, such as the velocity of hands and fingers Momentum and Inertia Module 702 can use image motion, image size, and angle changes of objects in the image plane or in a three-dimensional space to estimate the velocity and direction of objects in the space or on a display. Momentum and Inertia Module 702 is coupled to Object and Gesture Recognition System 722 to estimate the velocity of gestures performed by hands, fingers, and other body parts and then to apply those estimates to determine momentum and velocities to virtual objects that are to be affected by the gesture.

3D Image Interaction and Effects Module 705 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module 705 in the foreground on one or more of the displays.

In a first example embodiment, an apparatus comprises a first camera configured to capture a sequence of images of the object, a second device comprising a projector or a camera, a processing unit to receive the sequence of images and determine depth information in response to parameters of the camera and the second device, one or more temperature sensors; and a thermal correction unit responsive to temperature information from the one or more temperature sensors to adjust one or more of the calibration parameters of the first camera and the second device.

In another example embodiment, the subject matter of the first example embodiment can optionally include that the second device comprises a projector, and further wherein the calibration parameters characterize an optical system formed by the projector and the first camera and comprise intrinsic parameters of the first camera and the projector and extrinsic parameters of first camera. In another example embodiment, the subject matter of the last example embodiment can optionally include that the intrinsic parameters comprise one or more of a focal distance of the first camera, a principal point of projection of the projector, and a distortion model and wherein the extrinsic parameters comprise a relative location and orientation of the projector with respect to the first camera.

In another example embodiment, the subject matter of the first example embodiment can optionally include that the processing unit is configured to perform a triangulation process using the calibration parameters. In another example embodiment, the subject matter of the last example embodiment can optionally include that the calibration parameters are initialized by one or more calibration procedures and further wherein the thermal correction unit is operable to adjust one or more of the calibration parameters based on outputs from a thermal correction model that is responsive to the temperature information from the one or more temperature sensors.

In another example embodiment, the subject matter of the first example embodiment can optionally include that the first camera comprises a digital infrared camera.

In another example embodiment, the subject matter of the first example embodiment can optionally include that the second device comprises a projector configured to project a sequence of light patterns on an object.

In another example embodiment, the subject matter of the first example embodiment can optionally include that the projector is configured to project one-dimensional coded light patterns on the object.

In another example embodiment, the subject matter of the first example embodiment can optionally include a second camera configured to capture a second image of the object illuminated with the projected light patterns and configured to capture a texture image of the object in the second image. In another example embodiment, the subject matter of the first example embodiment can optionally include that the second device comprises an infrared (IR) projector, the first camera comprises an IR camera, and the second camera comprises a red, green, and blue (RGB) camera.

In a second example embodiment, a method comprises capturing, using a first camera, a sequence of images of the object; and determining depth information using calibration parameters of the camera and a second device, including adjusting, based on temperature information from one or more temperature sensors, one or more of the calibration parameters of the first camera and the second device, where the second device comprises a projector or a camera.

In another example embodiment, the subject matter of the second example embodiment can optionally include that the second device comprises a projector that projects the light patterns and further wherein the calibration parameters characterize an optical system formed by the projector and the first camera and comprise intrinsic parameters of the first camera and the projector and extrinsic parameters of first camera.

In another example embodiment, the subject matter of the second example embodiment can optionally include that the intrinsic parameters comprise one or more of a focal distance of the first camera, a principal point of projection of the projector, and a distortion model and wherein the extrinsic parameters comprise a relative location and orientation of the projector with respect to the first camera.

In another example embodiment, the subject matter of the second example embodiment can optionally include that determining depth information comprises performing a triangulation process using the calibration parameters. In another example embodiment, the subject matter of the last example embodiment can optionally include projecting, using a projector, a sequence of light patterns on an object, and wherein the calibration parameters are initialized by one or more calibration procedures and further wherein adjusting the one or more of the calibration parameters of the projector and the camera is based on outputs from a thermal correction model that is responsive to the temperature information from the one or more temperature sensors.

In a third example embodiment, an article of manufacture has one or more non-transitory computer readable storage media storing instructions which when executed by a system to perform a method comprises: projecting a sequence of light patterns on an object; capturing a sequence of images of the object illuminated with the projected light patterns; determining depth information in response to parameters of the projector and camera; and adjusting, based on temperature information from one or more temperature sensors, one or more of the calibration parameters of the projector and the camera.

In another example embodiment, the subject matter of the third example embodiment can optionally include that the calibration parameters characterize an optical system formed by the projector and the first camera and comprise intrinsic parameters of the first camera and the projector and extrinsic parameters of first camera.

In another example embodiment, the subject matter of the last example embodiment can optionally include that the intrinsic parameters comprise one or more of a focal distance of the first camera, a principal point of projection of the projector, and a distortion model and wherein the extrinsic parameters comprise a relative location and orientation of the projector with respect to the first camera.

In another example embodiment, the subject matter of the third example embodiment can optionally include that determining depth information comprises performing a triangulation process using the calibration parameters.

In another example embodiment, the subject matter of the third example embodiment can optionally include that the calibration parameters are initialized by one or more calibration procedures and further wherein adjusting the one or more of the calibration parameters of the projector and the camera is based on outputs from a thermal correction model that is responsive to the temperature information from the one or more temperature sensors.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
    thermal correction circuitry to generate a compensation value based on temperature information from a temperature sensor of a capture device;
    computation circuitry to modify a calibration parameter of the capture device based on the compensation value; and
    triangulation processing circuitry to generate a depth value based on a pixel location of an object in an image captured by the capture device, a location of a projected plane in the image, and the calibration parameter, the depth value corresponding to a distance to the object in the image.

2. The apparatus of claim 1, wherein the triangulation processing circuitry is to generate the depth value based on an intersection of the projected plane and a ray projected by the capture device.

3. The apparatus of claim 1, further including a projector to generate the projected plane in the image by projecting at least one of a one-dimensional coded light pattern or a two-dimensional coded light pattern.

4. The apparatus of claim 1, wherein the triangulation processing circuitry is to generate the depth value based on at least one of an intrinsic parameter or an extrinsic parameter of the capture device.

5. The apparatus of claim 4, wherein the intrinsic parameter is a focal distance of the capture device, a principal point of projection of a projector that is to generate the projected plane, a distortion model, or a relative location of the projector with respect to the capture device.

6. The apparatus of claim 4, wherein the extrinsic parameter is at least one of a relative location of a projector or an orientation of the projector with respect to a camera of the capture device, the camera to capture the image, the projector to generate the projected plane.

7. The apparatus of claim 1, wherein the computation circuitry is to modify the calibration parameter for ones of frames corresponding to a frame rate of the capture device.

8. The apparatus of claim 1, wherein the pixel location is a first pixel location, the image is a first image, and the capture device includes a first camera to capture the first image, the triangulation processing circuitry to generate the depth value based on (1) the first pixel location, (2) a second pixel location of the object in a second image captured by a second camera of the capture device, and (3) the calibration parameter, the depth value corresponding to the distance to the object based on the first image and the second image.

9. A storage device or storage disk comprising instructions that, when executed, cause at least one processor to at least:
    generate a compensation value based on temperature information from a temperature sensor of a capture device;
    modify a calibration parameter of the capture device based on the compensation value; and
    generate a depth value based on a pixel location of an object in an image captured by the capture device, a location of a projected plane in the image, and the calibration parameter, the depth value corresponding to a distance to the object in the image.

10. The storage device or storage disk of claim 9, wherein the instructions, when executed, cause the at least one processor to generate the depth value based on an intersection of the projected plane and a ray projected by the capture device.

11. The storage device or storage disk of claim 9, wherein the instructions, when executed, cause the at least one processor to generate the projected plane in the image by projecting at least one of a one-dimensional coded light pattern or a two-dimensional coded light pattern.

12. The storage device or storage disk of claim 9, wherein the instructions, when executed, cause the at least one processor to generate the depth value based on at least one of an intrinsic parameter or an extrinsic parameter of the capture device.

13. The storage device or storage disk of claim 12, wherein the intrinsic parameter is a focal distance of the capture device, a principal point of projection of a projector that is to generate the projected plane, a distortion model, or a relative location of the projector with respect to the capture device.

14. The storage device or storage disk of claim 12, wherein the extrinsic parameter is at least one of a relative location of a projector or an orientation of the projector with respect to a camera of the capture device, the camera to capture the image, the projector to generate the projected plane.

15. The storage device or storage disk of claim 9, wherein the instructions, when executed, cause the at least one processor to modify the calibration parameter for ones of frames corresponding to a frame rate of the capture device.

16. The storage device or storage disk of claim 9, wherein the pixel location is a first pixel location, the image is a first image, and the capture device includes a first camera to capture the first image, the instructions, when executed, to cause the at least one processor to generate the depth value based on (1) the first pixel location, (2) a second pixel location of the object in a second image captured by a second camera of the capture device, and (3) the calibration parameter, the depth value corresponding to the distance to the object based on the first image and the second image.

17. A method comprising:
generating, by executing an instruction with a processor, a compensation value based on temperature information from a temperature sensor of a capture device;
modifying, by executing an instruction with the processor, a calibration parameter of the capture device based on the compensation value; and
generating, by executing an instruction with the processor, a depth value based on a pixel location of an object in an image captured by the capture device, a location of a projected plane in the image, and the calibration parameter, the depth value corresponding to a distance to the object in the image.

18. The method of claim 17, wherein the generating of the depth value is based on an intersection of the projected plane and a ray projected by the capture device.

19. The method of claim 17, wherein the generating of the depth value is based on at least one of an intrinsic parameter or an extrinsic parameter of the capture device, the intrinsic parameter is a focal distance of the capture device, a principal point of projection of a projector that is to generate the projected plane, a distortion model, or a relative location of the projector with respect to the capture device, the extrinsic parameter is at least one of a relative location of the projector or an orientation of the projector with respect to a camera of the capture device, wherein the camera is to capture the image, and the projector is to generate the projected plane.

20. The method of claim 17, wherein the pixel location is a first pixel location, the image is a first image, and the capture device includes a first camera to capture the first image, the generating the depth value based on (1) the first pixel location, (2) a second pixel location of the object in a second image captured by a second camera of the capture device, and (3) the calibration parameter, the depth value corresponding to the distance to the object based on the first image and the second image.

* * * * *